(12) United States Patent
Chen et al.

(10) Patent No.: US 7,492,070 B2
(45) Date of Patent: Feb. 17, 2009

(54) COOLING FAN

(75) Inventors: Chien-Jung Chen, Jen-Wu Hsiang (TW); Hsien-Wen Liu, Taichung (TW); Hui-Chao Hsu, Kaohsiung (TW)

(73) Assignee: Yen Sun Technology Corp., Jen-Wu Hsiang, Kaohsiung Hsien (TW)

( * ) Notice: Subject to any disclaimer, the term of this patent is extended or adjusted under 35 U.S.C. 154(b) by 455 days.

(21) Appl. No.: 11/482,066

(22) Filed: Jul. 7, 2006

(65) Prior Publication Data
US 2007/0114860 A1    May 24, 2007

(30) Foreign Application Priority Data
Nov. 23, 2005 (TW) .............................. 94220317 U

(51) Int. Cl.
H02K 5/00 (2006.01)
H02K 7/00 (2006.01)
H02K 11/00 (2006.01)
F04D 29/00 (2006.01)

(52) U.S. Cl. ................... 310/89; 310/67 R; 360/99.08; 415/118; 415/213.1; 415/214.1

(58) Field of Classification Search ............... 310/67 R, 310/89, 91; 415/118, 211.2, 213.1, 214.1, 415/229, 244 R; 360/98.07, 99.04, 99.08; 417/423.7, 423.12–426.15
See application file for complete search history.

(56) References Cited

U.S. PATENT DOCUMENTS

| | | | | |
|---|---|---|---|---|
| 5,650,678 A * | 7/1997 | Yokozawa et al. | ............ | 310/90 |
| 6,320,291 B1 * | 11/2001 | Lin et al. | ............ | 310/91 |
| 6,608,412 B2 * | 8/2003 | Horng et al. | ............ | 310/71 |
| 6,926,497 B2 * | 8/2005 | Lin et al. | ............ | 415/213.1 |
| 7,442,005 B2 * | 10/2008 | Yeh et al. | ............ | 415/200 |
| 2007/0096570 A1 * | 5/2007 | Lin et al. | ............ | 310/67 R |

* cited by examiner

Primary Examiner—Tran N Nguyen
(74) Attorney, Agent, or Firm—Davidson Berquist Jackson & Gowdey, LLP

(57) ABSTRACT

A cooling fan includes: a casing having a surrounding wall that defines an accommodating space; a circuit board disposed in the accommodating space and including a substrate and a control circuit, the substrate having a center portion that has a peripheral edge, and a plurality of spaced apart connecting beams that extend from the peripheral edge of the center portion and that are connected directly and securely to the surrounding wall; a hollow shaft secured directly to and protruding from the circuit board into the accommodating space; a stator mounted securely on the center portion of the substrate of the circuit board and coupled to the control circuit; a fan blade unit disposed in the accommodating space and including an annular hub journalled rotatably to the hollow shaft; and a rotor mounted on the hub.

4 Claims, 6 Drawing Sheets

COOLING FAN

CROSS-REFERENCE TO RELATED APPLICATION

This application claims priority of Taiwanese application No. 094220317, filed on Nov. 23, 2005.

BACKGROUND OF THE INVENTION

1. Field of the Invention

The invention relates to a cooling fan, more particularly to a cooling fan that has a casing and a circuit board directly connected to a surrounding wall of the casing.

2. Description of the Related Art

Referring to FIGS. 1 and 2, a conventional cooling fan 1 is shown to include a casing 11, a control unit 12, a stator 13, a fan blade unit 14 and a pair of bearings 15.

The casing 11 has a surrounding wall 110, a mounting base 111 extending from the surrounding wall 110, and a hollow shaft 112 fixedly mounted on the mounting base 111.

The control unit 12 includes a circuit board 121 seated on a shoulder of the hollow shaft 112 and spaced apart from the mounting base 111, and a sensing component 122 provided on the circuit board 121.

The stator 13 is secured to and is connected electrically to the circuit board 121 of the control unit 12. The fan blade unit 14 is rotatable relative to the stator 13.

The fan blade unit 14 includes a hollow hub 141 that covers the stator 13, a rotating axle 142 disposed in the hollow hub 141 and journalled to the hollow shaft 112 of the casing 11, a plurality of blades 143 extending outwardly from the hollow hub 141, a magnetic ring 144 serving as a rotor and mounted on an inner face of the hollow hub 141.

The two bearings 15 are spaced apart from each other, and are mounted in the hollow shaft 112 of the casing 11. The rotating axle 142 is journalled to the hollow shaft 112 through the bearings 15.

SUMMARY OF THE INVENTION

The object of the present invention is to provide a cooling fan that has a smaller size and that is less expensive to manufacture as compared to the aforesaid conventional cooling fan.

Accordingly, a cooling fan of this invention comprises: a casing having a surrounding wall that defines front and rear openings for passage of fluid flow therethrough and that has an inner wall surface which defines an accommodating space; a circuit board disposed in the accommodating space and including a substrate and a control circuit, the substrate having a center portion that has a peripheral edge, and a plurality of spaced apart connecting beams that extend from the peripheral edge of the center portion and that are connected directly and securely to the inner wall surface of the surrounding wall, the control circuit being disposed on the center portion of the substrate; a hollow shaft secured directly to and protruding transversely from the circuit board into the accommodating space, and defining a rotation axis; a stator mounted securely on the center portion of the substrate of the circuit board, surrounding the hollow shaft, and coupled to the control circuit; a fan blade unit disposed in the accommodating space and including an annular hub journalled rotatably to the hollow shaft, surrounding the stator, and having an inner wall; and a rotor mounted on the inner wall of the hub and surrounding and coupled magnetically to the stator so as to rotate together with the fan blade unit about the rotation axis when the stator is actuated.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
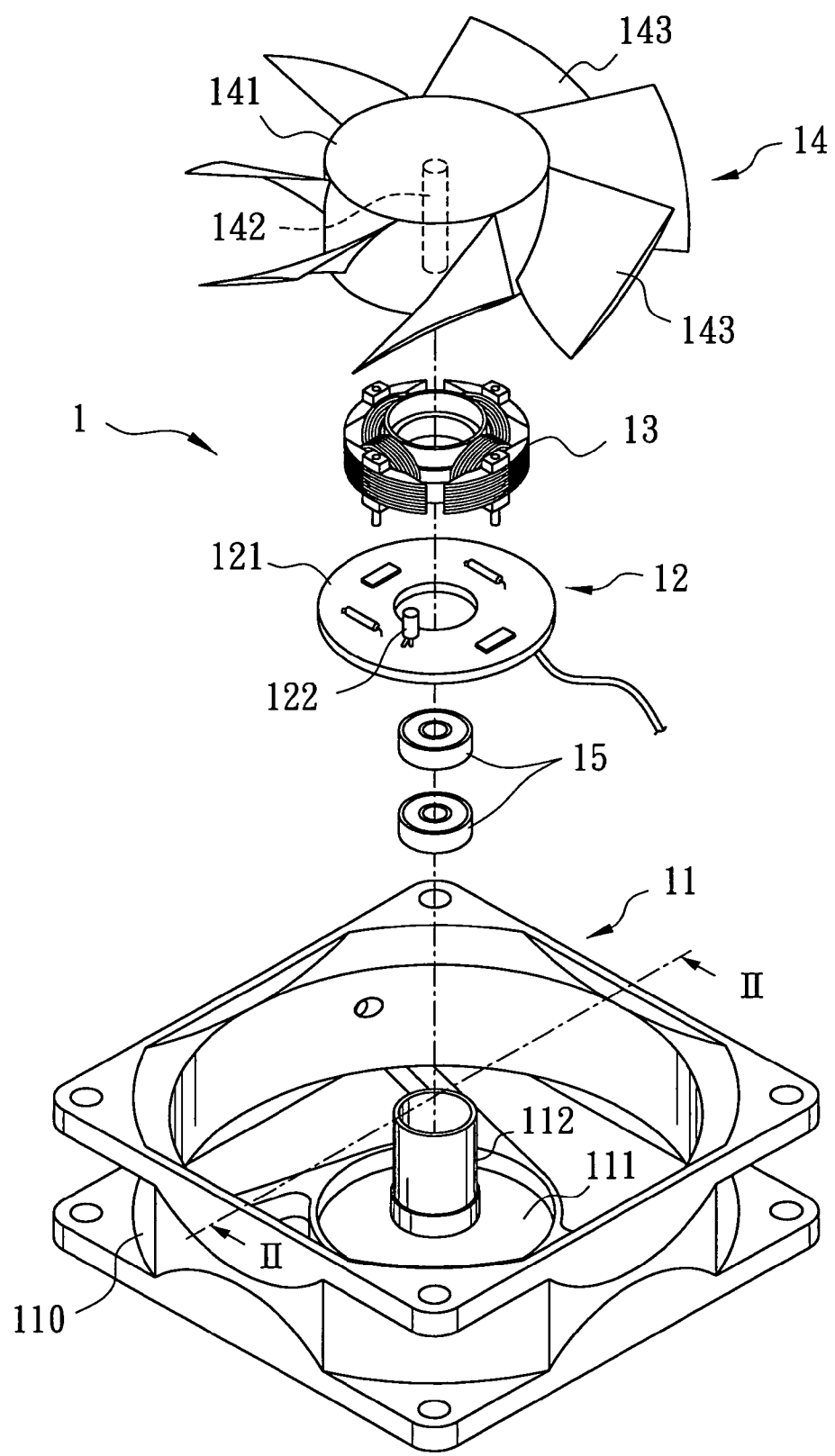
FIG. 1 is an exploded perspective view of a conventional cooling fan.
Figure 2:
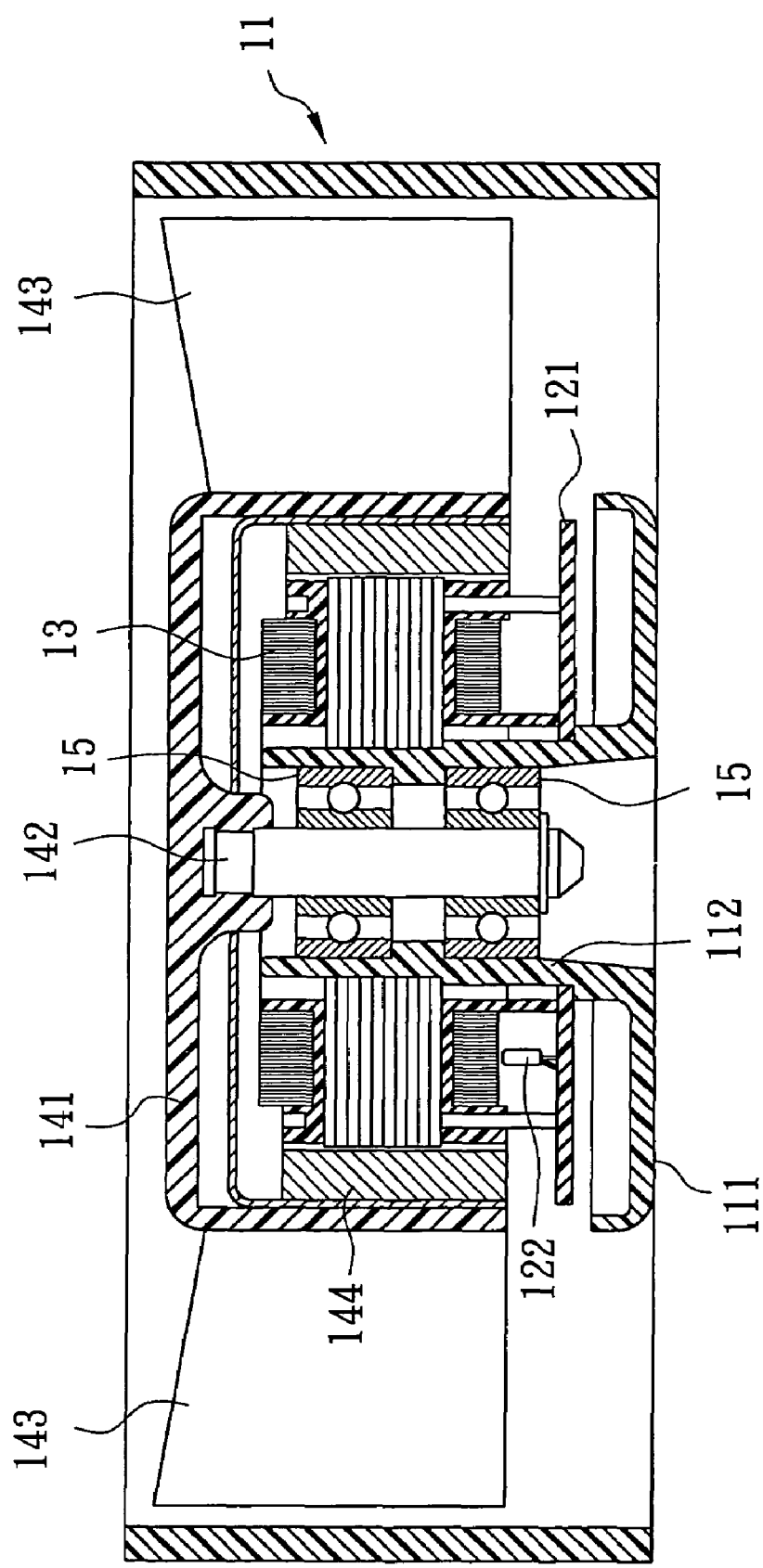
FIG. 2 is a sectional view taken along the line II-II in FIG. 1.
Figure 3:
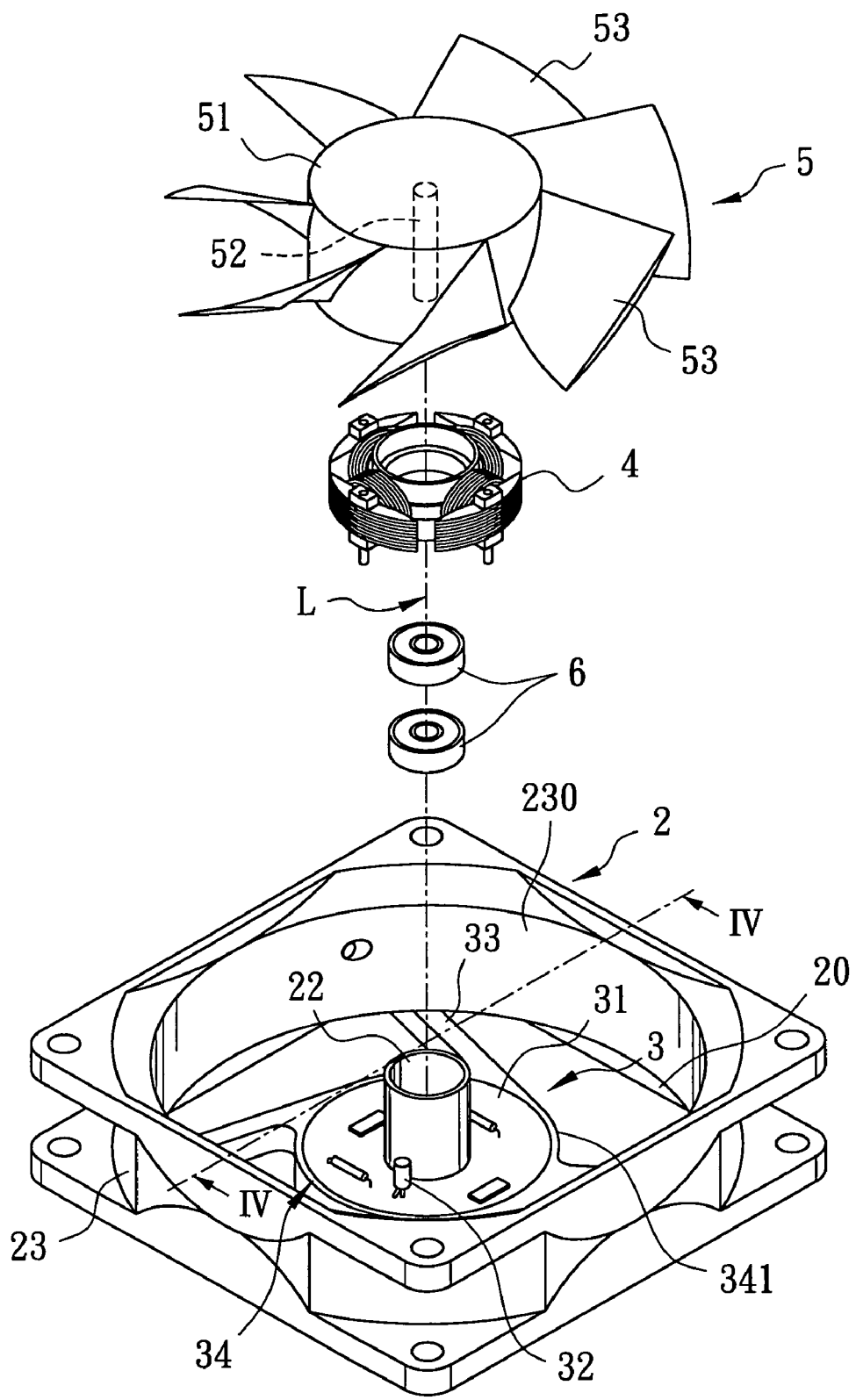
FIG. 3 is an exploded perspective view of the preferred embodiment of a cooling fan according to the present invention.
Figure 4:
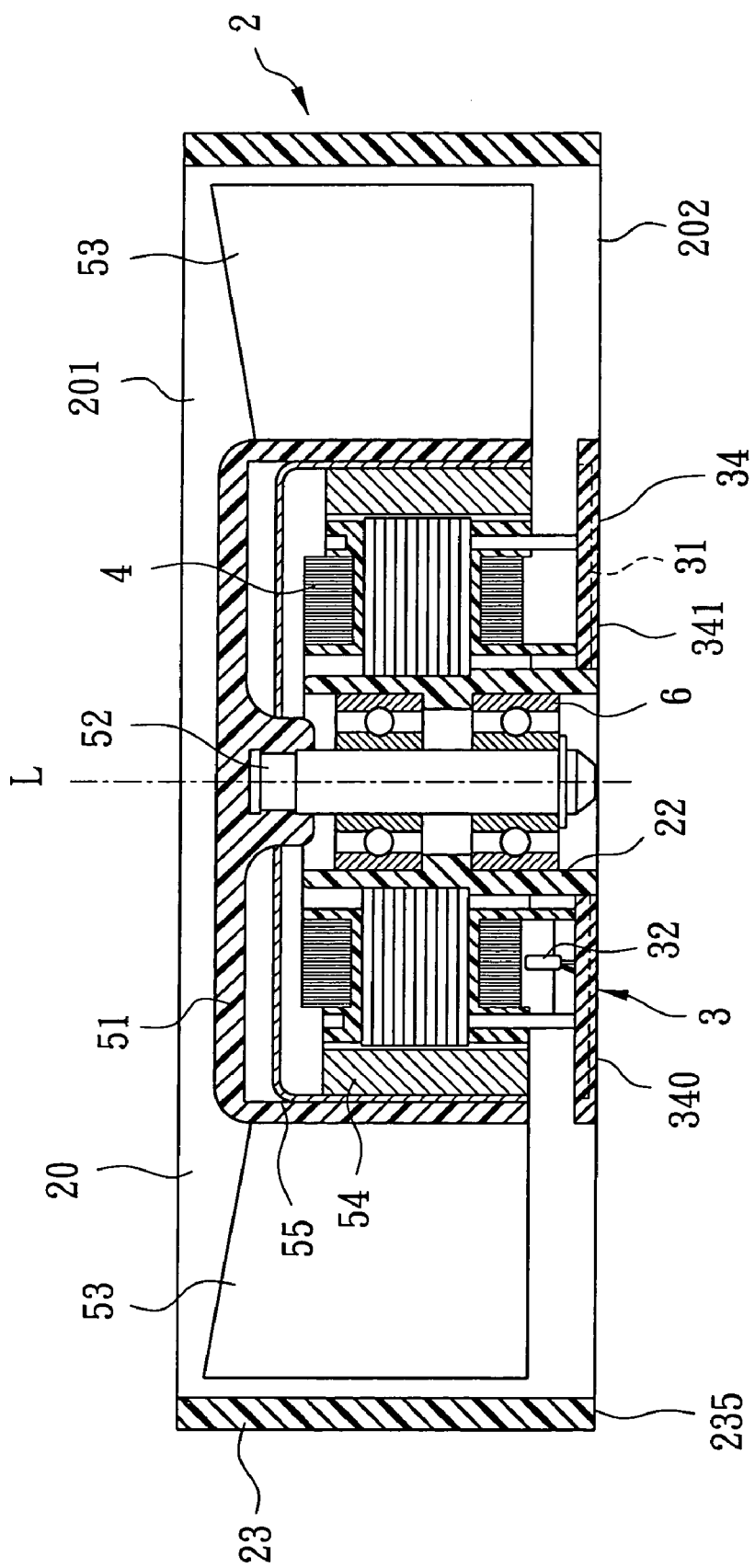
FIG. 4 is a sectional view taken along the line IV-IV in FIG. 3.
Figure 5A:
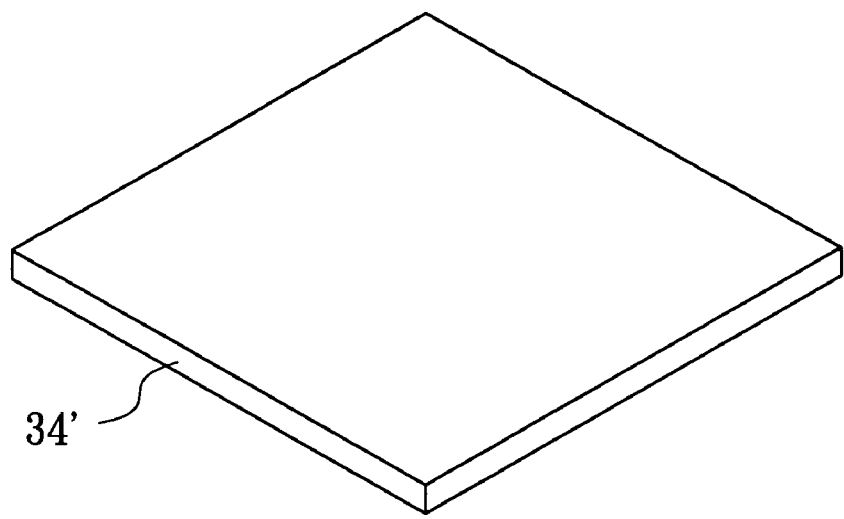
FIGS. 5A to 5D are schematic views to illustrate how an assembly of a casing and a circuit board of the preferred embodiment is manufactured.
Figure 5B:
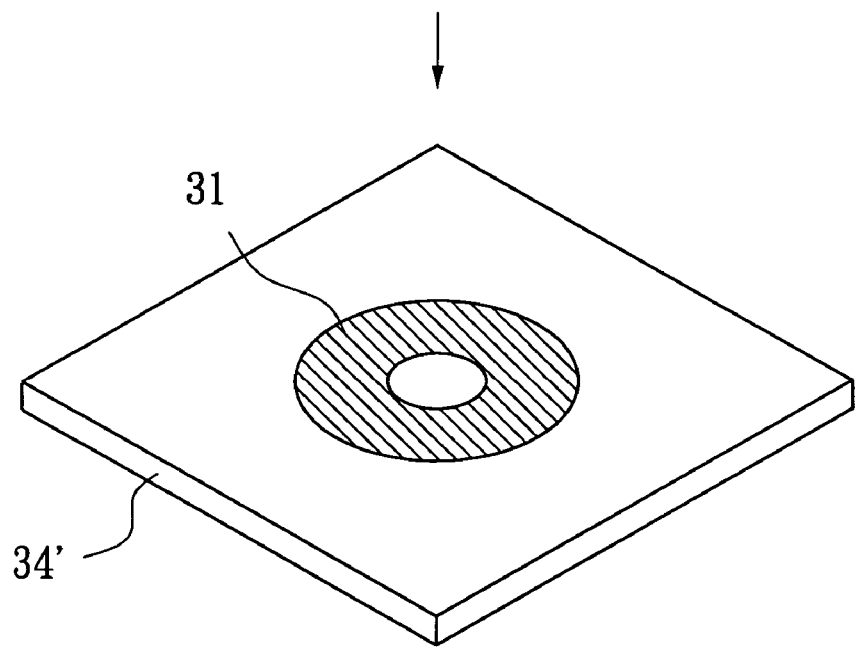
Figure 5C:
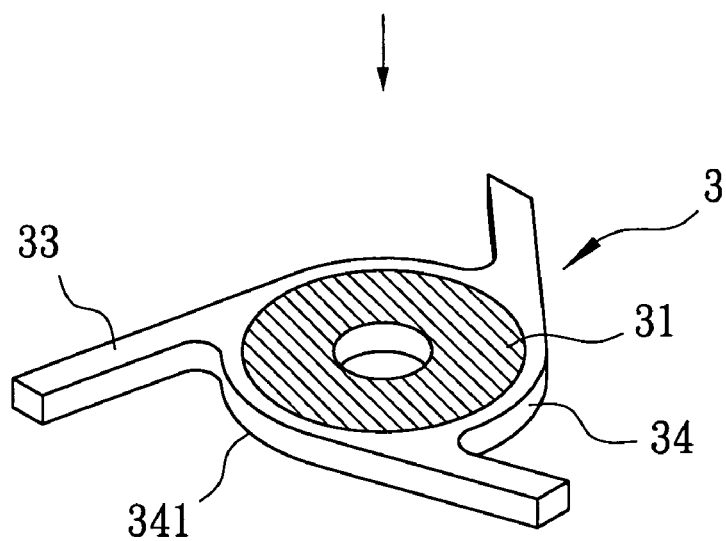
Figure 5D:
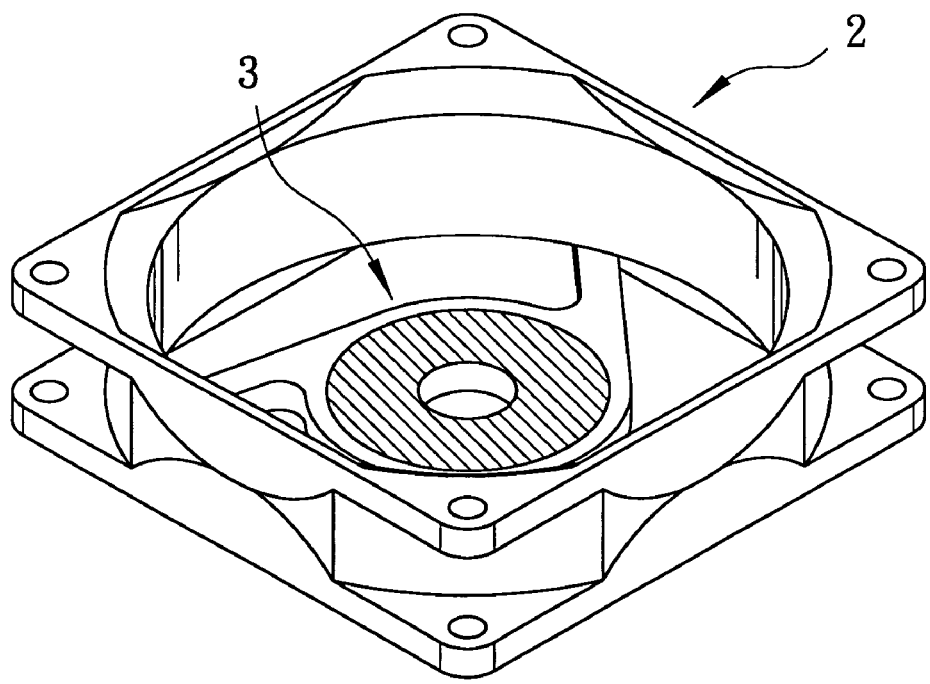

Referring to FIGS. 3 and 4, the preferred embodiment of a cooling fan according to the present invention is shown to include: a casing 2 having a surrounding wall 23 that defines front and rear openings 201, 202 for passage of fluid flow therethrough and that has an annular inner wall surface 230 which defines an accommodating space 20; a circuit board 3 disposed in the accommodating space 20 and including a substrate 34 and a control circuit 31, the substrate 34 having a center portion 341 that has a peripheral edge, and a plurality of spaced apart connecting beams 33 that extend from the peripheral edge of the center portion 341 and that are connected directly and securely to the inner wall surface 230 of the surrounding wall 23, the control circuit 31 being disposed on the center portion 341 of the substrate 34; a hollow shaft 22 secured directly to and protruding transversely from the circuit board 3 into the accommodating space 20, and defining a rotation axis (L); a stator 4 mounted securely on the center portion 341 of the substrate 34 of the circuit board 3, surrounding the hollow shaft 22, and coupled to the control circuit 31; a fan blade unit 5 disposed in the accommodating space 20 and including an annular hub 51 journalled rotatably to the hollow shaft 22, surrounding the stator 4, and having an inner wall 55; and a rotor 54 mounted on the inner wall 55 of the hub 51 and surrounding and coupled magnetically to the stator 4 so as to rotate together with the fan blade unit 5 about the rotation axis (L) when the stator 4 is actuated.

The fan blade unit 5 further includes an axle 52 extending from the hub 51, a pair of bearings 6 mounted in the hollow shaft 22, and a plurality of blades 53 extending outwardly from the hub 51. The hub 51 is journalled to the hollow shaft 22 by extending the axle 52 through the bearings 6.

The surrounding wall 23 of the casing 2 has a planar surface 235 transverse to the rotation axis (L). The substrate 34 has a planar surface 340 that is substantially flush with the planar surface 235 of the surrounding wall 23.

FIGS. 5A to 5D illustrate consecutive steps of a method for forming the cooling fan of the preferred embodiment. A board 34' of a resin material to serve as the substrate 34 is prepared (see FIG. 5A), and is formed with the control circuit 31 on a center portion thereof (see FIG. 5B). The board 34' is subsequently cut into a desired shape having the central portion 341 and the beams 33 (see FIG. 5C), followed by adhesive connection to the casing 2 (see FIG. 5D). The hollow shaft 22 is then adhesively connected to the central portion 341 of the thus formed circuit board 3.

The control circuit 31 is provided with a sensing component 32 so as to control signals supplied to the stator 4 in a conventional manner.

By directly incorporating the function of the mounting base 111 of the conventional cooling fan into the substrate 34 of the circuit board 3 of the cooling fan of this invention, the size and the manufacturing cost of the cooling fan of this invention can be considerably reduced.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A cooling fan comprising:
   a casing having a surrounding wall that defines front and rear openings for passage of fluid flow therethrough and that has an inner wall surface which defines an accommodating space;
   a circuit board disposed in said accommodating space and including a substrate and a control circuit, said substrate having a center portion that has a peripheral edge, and a plurality of spaced apart connecting beams that extend from said peripheral edge of said center portion and that are connected directly and securely to said inner wall surface of said surrounding wall, said control circuit being disposed on said center portion of said substrate;
   a hollow shaft secured directly to and protruding transversely from said circuit board into said accommodating space, and defining a rotation axis;
   a stator mounted securely on said center portion of said substrate of said circuit board, surrounding said hollow shaft, and coupled to said control circuit;
   a fan blade unit disposed in said accommodating space and including an annular hub journalled rotatably to said hollow shaft, surrounding said stator, and having an inner wall; and
   a rotor mounted on said inner wall of said hub and surrounding and coupled magnetically to said stator so as to rotate together with said fan blade unit about said rotation axis when said stator is actuated.

2. The cooling fan as claimed in claim 1, wherein said fan blade unit further includes a plurality of blades extending outwardly from said hub.

3. The cooling fan as claimed in claim 1, further comprising a pair of bearings mounted in said hollow shaft, said hub being provided with an axle journalled to said hollow shaft through said bearings.

4. The cooling fan as claimed in claim 1, wherein said surrounding wall of said casing has a planar surface transverse to said rotation axis, said substrate having a planar surface that is substantially flush with said planar surface of said surrounding wall.

* * * * *